US010020568B2

United States Patent
Den et al.

(10) Patent No.: US 10,020,568 B2
(45) Date of Patent: Jul. 10, 2018

(54) RFID INLET ANTENNA AND RFID EMPLOYING SAME

(75) Inventors: Kengo Den, Osaka (JP); Masateru Watanabe, Osaka (JP); Hiroki Higashiyama, Osaka (JP); Masataka Saruwatari, Osaka (JP)

(73) Assignee: TOYO ALUMINIUM KABUSHIKI KAISHA, Osaka-shi (JP)

( * ) Notice: Subject to any disclaimer, the term of this patent is extended or adjusted under 35 U.S.C. 154(b) by 229 days.

(21) Appl. No.: 14/130,037

(22) PCT Filed: Jun. 22, 2012

(86) PCT No.: PCT/JP2012/066013
§ 371 (c)(1),
(2), (4) Date: Dec. 30, 2013

(87) PCT Pub. No.: WO2013/005584
PCT Pub. Date: Jan. 10, 2013

(65) Prior Publication Data
US 2014/0159963 A1 Jun. 12, 2014

(30) Foreign Application Priority Data
Jul. 4, 2011 (JP) .................. 2011-148394

(51) Int. Cl.
*H01Q 1/38* (2006.01)
*G06K 19/077* (2006.01)
*G06K 19/073* (2006.01)
(52) U.S. Cl.
CPC .......... *H01Q 1/38* (2013.01); *G06K 19/0739* (2013.01); *G06K 19/0776* (2013.01); *G06K 19/07722* (2013.01); *G06K 19/07726* (2013.01)

(58) Field of Classification Search
CPC ........ G06K 19/07726; G06K 19/0739; G06K 19/07722; G06K 19/0776; H01Q 1/38
See application file for complete search history.

(56) References Cited

U.S. PATENT DOCUMENTS

| | | | |
|---|---|---|---|
| 2006/0139174 A1* | 6/2006 | Matsushita | ........ G06K 19/0739 340/572.8 |
| 2006/0273179 A1* | 12/2006 | Yamakage | ....... G06K 19/07749 235/492 |
| 2010/0328162 A1 | 12/2010 | Matsushita et al. | |

FOREIGN PATENT DOCUMENTS

| | | |
|---|---|---|
| CN | 102067381 A | 5/2011 |
| EP | 1 576 536 | 9/2005 |
| JP | 2000-057292 A | 2/2000 |

(Continued)

OTHER PUBLICATIONS

International Search Report dated Sep. 25, 2012, issued in corresponding application No. PCT/JP2012/066013.
(Continued)

*Primary Examiner* — Graham Smith
*Assistant Examiner* — Noel Maldonado
(74) *Attorney, Agent, or Firm* — Westerman, Hattori, Daniels & Adrian, LLP

(57) ABSTRACT

The present invention provides an RFID inlet antenna comprising a resin base film and a metallic circuit formed via an adhesive layer on the surface of the resin base film. The RFID inlet antenna is prevented from removal of the metallic circuit by unauthorized detachment after the RFID inlet antenna is bonded to an item by a bonding material disposed in such a manner as to cover the metallic circuit.

16 Claims, 2 Drawing Sheets

(56) References Cited

FOREIGN PATENT DOCUMENTS

| | | |
|---|---|---|
| JP | 2003-331248 A | 11/2003 |
| JP | 2004-213614 A | 7/2004 |
| TW | M328487 U1 | 8/1996 |
| TW | M393745 U1 | 12/2010 |
| WO | 02/11094 A1 | 2/2002 |
| WO | 2004/061762 A1 | 7/2004 |

OTHER PUBLICATIONS

Extended European Search Report dated Mar. 27, 2015, issued in corresponding European Patent Application No. 12807442.4 (6 pages).

Office Action dated Jan. 21, 2016, issued in counterpart Taiwanese Patent Application No. 101123876, with English translation (11 pages).

* cited by examiner

RFID INLET ANTENNA AND RFID EMPLOYING SAME

TECHNICAL FIELD

The present invention relates to an RFID inlet antenna comprising a resin base film and a metallic circuit formed via an adhesive layer on the surface of the resin base film, and an RFID using the antenna. The term "RFID" used herein stands for "Radio Frequency IDentification," and refers to an IC tag that allows for individual identification under non-contacting conditions utilizing electric waves.

BACKGROUND ART

RFID inlet antennas comprise a resin base film and a metallic circuit formed via an adhesive layer on the surface of the resin base film. In view of heat resistance and dimensional stability, a polyethylene terephthalate film, a polyethylene naphthalate film, or the like, is used as the resin base film. RFID refers to a system formed by mounting an IC chip on a metallic circuit of an RFID inlet antenna, and then applying a bonding material in such a manner as to cover the IP chip and the circuit to form a bonding material layer.

Such RFID inlet antennas often comprise an IC chip mounted on a metallic circuit, a bonding material layer formed by applying a bonding material in such a manner as to cover the circuit and the chip, and a release paper covering the bonding material layer; and are distributed in this form. In this case, the end user removes the release paper, and attaches the bonding material layer to an item (e.g., an item for distribution) to treat the RFID as a control label.

Although such an RFID inlet antenna is useful in that individual items can be identified under non-contacting conditions, the RFID inlet antenna (particularly the metallic circuit), once attached, may be detached from the item and fraudulently utilized (falsified) by attachment to another item.

As a measure to prevent such fraudulent utilization, for example, Patent Literature (PLT) 1 discloses an invention directed to "a non-contact data carrier label comprising (1) a substrate film, (2) a release agent layer provided on a portion of one side of the substrate film, (3) an adhesive embedding layer provided on the release agent layer side of the substrate film, the adhesive embedding layer having a noncontact data carrier element embedded therein and covering the whole release agent layer, wherein the adhesive embedding layer portion having the noncontact data carrier element embedded therein is substantially present over a releasable portion covering the release agent layer and a non-releasable portion not covering the release agent layer."

As an effect thereof, the following is disclosed in paragraph [0041] of PTL 1. "Because the detachment-destroyed noncontact data carrier label according to the present invention comprises an adhesive embedding layer that comprises a releasable portion and a non-releasable portion and that has a non-contact data carrier element embedded therein in such a manner that the non-contact data carrier element is present over the releasable and non-releasable portions, the non-contact data carrier element is destroyed at the same time by unauthorized detachment. Accordingly, unauthorized detachment is rendered pointless, and thus effectively prevented. In the detachment-destroyed noncontact data carrier label of the present invention, provision of slits on the periphery of the releasable portion of the adhesive embedding layer can facilitate cutting/destruction of the non-contact data carrier element by unauthorized detachment and can more reliably control the site of cutting/destruction."

However, when the present inventors prepared an RFID inlet antenna like the non-contact carrier label disclosed in PTL 1, which comprises a substrate film (a resin base film) and a release agent layer (a release coating layer) formed thereon in such a manner as to be embedded in an adhesive embedding layer (a bonding material layer), and conducted a peeling test by bonding a cover member to the bonding material layer and pulling the resin base film and the cover member in opposite directions, cohesion of the bonding material layer was destroyed, and the RFID inlet antenna was detached with the bonding material layer as a boundary, without cutting/destroying the non-contact data carrier element (metallic circuit) (see FIG. 1). Thus, further improvement of the technique disclosed in PTL 1 is necessary to prevent unauthorized detachment.

Although PTL 1 proposes that slits on the periphery of the releasable portion are preferable to prevent unauthorized detachment, slitting currently known RFID inlet antennas is not easy. For example, slitting a resin base film may be considered; however, such slitting should be avoided, because such an RFID inlet antenna is produced by a roll-to-roll process using a resin base film as a substrate. Slitting an adhesive layer may be considered; however, such slitting is actually difficult, because the adhesive layer has a small thickness of about 1 to 5 μm. Accordingly, the development of a technique that can prevent unauthorized detachment without slitting has been desired.

CITATION LIST

Patent Literature

PTL 1: JP2000-57292A

SUMMARY OF INVENTION

Technical Problem

An object of the present invention is to provide an RFID inlet antenna comprising a resin base film and a metallic circuit formed via an adhesive layer on the surface of the resin base film, the antenna being prevented from removal of the metallic circuit by unauthorized detachment after the antenna is bonded to an item by a bonding material disposed in such a manner as to cover the metallic circuit.

Solution to Problem

The present inventors conducted extensive research to achieve the above object. As a result, the inventors found that the above object can be achieved by forming a specifically patterned release coating layer on a portion of the interface between a resin base film and an adhesive layer. The present invention has been accomplished based on this finding.

More specifically, the present invention provides the following RFID inlet antenna and RFID.

1. An RFID inlet antenna comprising:
a resin base film;
a metallic circuit formed via an adhesive layer on the surface of the resin base film;
a release coating layer provided on a portion of the interface between the resin base film and the adhesive layer; and
a bonding material disposed in such a manner as to cover the metallic circuit; and the antenna being bonded to an item by the bonding material,
(1) wherein the bonding strength between the release coating layer and the resin base film is weaker than the bonding strength between the adhesive layer and the resin base film, (2) the release coating layer is formed in such a manner as to overlap at least a portion of the outer periphery of the RFID inlet antenna and a portion of the metallic circuit in an overhead view of the RFID inlet antenna.
2. The RFID inlet antenna according to item 1, wherein the metallic circuit is made of aluminum or copper.
3. The RFID inlet antenna according to item 1 or 2, wherein the bonding strength between the release coating layer and the resin base film is 1 N/15 mm or less.
4. The RFID inlet antenna according to any one of items 1 to 3, wherein the bonding strength between the adhesive layer and the resin base film is 3 N/15 mm or more.
5. The RFID inlet antenna according to any one of items 1 to 4, wherein the metallic circuit portion that overlaps an end portion of the release coating layer in the overhead view of the RFID inlet antenna has a line width of 1.2 mm or less and/or a thickness of 30 μm or less.
6. An RFID using the RFID inlet antenna according to any one of items 1 to 5.

The present invention is described below in detail.

The RFID inlet antenna of the present invention has the following features. The RFID inlet antenna comprises: a resin base film; a metallic circuit formed via an adhesive layer on the surface of the resin base film; a release coating layer provided on a portion of the interface between the resin base film and the adhesive layer; and a bonding material disposed in such a manner as to cover the metallic circuit, and the antenna is bonded to an item by the bonding material. (1) The bonding strength between the release coating layer and the resin base film is weaker than the bonding strength between the adhesive layer and the resin base film. (2) The release coating layer is formed in such a manner as to overlap at least a portion of the outer periphery of the RFID inlet antenna and a portion of the metallic circuit in an overhead view of the RFID inlet antenna.

In the RFID inlet antenna of the present invention, in particular, based on the structural feature that the release coating layer is formed in such a manner as to overlap at least a portion of the outer periphery of the RFID inlet antenna and a portion of the metallic circuit in an overhead view of the RFID inlet antenna, the metallic circuit is prevented from removal by unauthorized detachment after the antenna is bonded to an item by a bonding material disposed in such a manner as to cover the metallic circuit. Specifically, upon unauthorized detachment, the release coating layer is detached from the resin base film before cohesion of the adhesive layer is destroyed; after complete detachment of the release coating layer, detachment proceeds in such a manner that the metallic circuit is cut/destroyed, thus preventing detachment of the metallic circuit in an intact state.

There is no limitation on the resin base film. Resin films known in the field of RFID inlet antennas can be used. Examples of such usable films include polyethylene, polypropylene, polyethylene terephthalate, polyethylene naphthalate, polycarbonate, polyvinyl chloride, polyimide, amorphous polyethylene terephthalate, liquid crystal polymers, and the like. Among these, at least one of polyethylene, polypropylene, polyethylene terephthalate, polyethylene naphthalate, polycarbonate, and polyvinyl chloride is preferable.

The type and thickness of the resin base film are usually selected according to the purpose and use of the final RFID product. When RFID is bonded to an item by a bonding material disposed in such a manner as to cover a metallic circuit and treated as a control label, polyethylene terephthalate, polyethylene naphthalate, and the like are preferably used, and the thickness of the film is typically 25 to 50 μm.

The adhesive layer is not particularly limited. For example, an adhesive such as an epoxy resin-, urethane resin-, polyamide-, acrylic resin-, or vinyl chloride resin solution-type adhesive can be used to form an adhesive layer. Among these, adhesives that have a bonding strength to the resin base film of 3 N/15 mm or more are preferable, and those having a bonding strength to the resin base film of 4 to 6 N/15 mm are more preferable. When the bonding strength between the adhesive layer and the resin base film is less than 3 N/15 mm, the metallic circuit may be destroyed due to external force applied during processing, such as metallic circuit formation or IC chip mounting.

There is no limitation on the thickness of the adhesive layer. The thickness is preferably about 1 to 10 μm, and more preferably 3 to 7 μm.

In the present invention, a release coating layer is provided on a portion of the interface between the resin base film and the adhesive layer. The release coating layer is not particularly limited insofar as the bonding strength between the release coating layer and the resin base film is weaker than the bonding strength between the adhesive layer and the resin base film, and the release coating layer is formed in such a manner as to overlap at least a portion of the outer periphery of the RFID inlet antenna and a portion of the metallic circuit in an overhead view of the RFID inlet antenna (see FIG. 2). The release coating layer thus formed prevents detachment of the metallic circuit in an intact state because if unauthorized detachment occurs after the RFID inlet antenna is bonded to an item by a bonding material disposed in such a manner to cover the metallic circuit, the release coating layer is detached from the resin base film before cohesion of the bonding material layer is destroyed, and after complete detachment of the release coating layer, detachment proceeds in such a manner that the metallic circuit is cut/destroyed.

Because unauthorized detachment can be done from any direction of the RFID inlet antenna, the release coating layer is preferably provided in many (a plurality of) directions, insofar as the above requirements are met. In reality, because RFID inlet antennas are generally square-shaped or rectangular, unauthorized detachment tends to occur from one of the four corners of the square or rectangle. Considering this point, providing release coating layers at the four corners is preferable. For example, four release coating layers are preferably disposed in such a manner that each release coating layer overlaps one of the four corners of the square or rectangle and a portion of the metallic circuit. Because the IC chip mounting portion, electrically connecting portion between the front and rear sides, and like portions greatly relate to electrical properties and are more prone to external force by IC chip mounting, crimping processing, etc. than the other portions, it is preferable for the release coating layer not to extend to these portions.

The release coating layer can be formed, for example, by preparing a release coating liquid by mixing 1 to 5 parts by weight of polyethylene terephthalate per 100 parts by weight of an acrylic resin and diluting the mixture with an organic solvent as desired, and applying the release coating liquid to a resin base film, followed by drying. As the release coating liquid, other materials such as fluorine resins and silicone resins can also be used.

There is no limitation on the thickness of the release coating layer. The thickness is preferably about 0.6 to 1.8 µm, and more preferably about 1.0 to 1.4 µm. The bonding strength between the release coating layer and the resin base film is preferably 1 N/15 mm or less; considering the durability during processing, the bonding strength is more preferably 0.05 to 1 N/15 mm. When the bonding strength between the release coating layer and the resin base film is more than 1 N/15 mm, the metallic circuit may not be destroyed upon unauthorized detachment. The difference between the bonding strength of the adhesive layer and the resin base film and the bonding strength between the release coating layer and the resin base film is preferably 2 N/15 mm or more, and more preferably 3 to 5 N/15 mm.

The metallic circuit may be, for example, a circuit produced by forming at least one metal foil selected from the group consisting of aluminum foil, copper foil, stainless steel foil, titanium foil, tin foil, and the like into a circuit shape by a resist method (an exposure/development method). Among these metal foils, aluminum foil or copper foil is most preferable from the viewpoint of economy and reliability. The aluminum foil is not limited to pure aluminum foil, and includes aluminum alloy foils. Materials of metal foils may be, for example, pure aluminum foil and aluminum alloy foils such as JIS (AA) 1030, 1N30, 1050, 1100, 8021 and 8079.

The line width and thickness of the metallic circuit are not limited. The line width is preferably 0.2 to 1.5 mm, and more preferably 0.4 to 0.8 mm. The thickness is preferably 7 to 60 µm, and more preferably 15 to 50 µm. In the present invention, the metallic circuit is cut/destroyed in the portion that overlaps an end portion of the release coating layer in an overhead view of the RFID inlet antenna. Therefore, it is preferable from the viewpoint of ease of cutting/destruction that at least the overlapped metallic circuit portion has a line width of 1.2 mm or less and/or a thickness of 30 µm or less. In particular, from the additional viewpoint of designing a fine-line metallic circuit, the thickness is preferably 30 µm or less.

In the RFID inlet antenna of the present invention, metallic circuits may be formed on both sides of the resin base film, rather than on one side thereof, via an adhesive layer. In this case, to prevent the detachment of the metallic circuits from both sides by unauthorized detachment, a release coating layer may be formed on both sides of the resin base film. However, it is preferable from the viewpoint of economy that a release coating layer is formed only on the side on which unauthorized detachment is more likely to occur.

The RFID inlet antenna of the present invention is attached to an item (e.g., an item for distribution) by a bonding material disposed in such a manner as to cover the metallic circuit, and is treated as a control label. The bonding material can be selected from bonding materials known in the field of RFID inlet antennas, and examples thereof include rubber, acrylic, silicone, and urethane bonding materials.

There is no limitation on the thickness of the bonding material layer formed of a bonding material. The thickness is preferably about 5 to 30 µm, and more preferably about 15 to 20 µm.

Preferably, the RFID inlet antenna of the present invention comprises a release paper (also called "a release sheet" or "a cover member") attached to the bonding material before attachment of the antenna to an item. Before use, the release paper is detached, and the RFID inlet antenna is attached to an item. Such a release paper can be suitably selected from known release papers according to the type of bonding material used.

Advantageous Effects of Invention

The RFID inlet antenna of the present invention comprises a release coating layer formed in such a manner as to overlap at least a portion of the outer periphery of the RFID inlet antenna and a portion of the metallic circuit in an overhead view of the RFID inlet antenna. In particular, due to this structure, after the RFID inlet antenna is bonded to an item by a bonding material disposed in such a manner as to cover the metallic circuit, removal of the metallic circuit by unauthorized detachment is prevented. Specifically, upon unauthorized detachment, the release coating layer is detached from the resin base film before cohesion of the bonding material is destroyed; after complete detachment of the release coating layer, detachment proceeds in such a manner that the metallic circuit is cut/destroyed, thus preventing detachment of the metallic circuit in an intact state.

DESCRIPTION OF EMBODIMENTS

The present invention is described below in more detail with reference to Examples and Comparative Examples. It should be noted that the invention is not limited to the Examples.

Example 1

Figure 2:
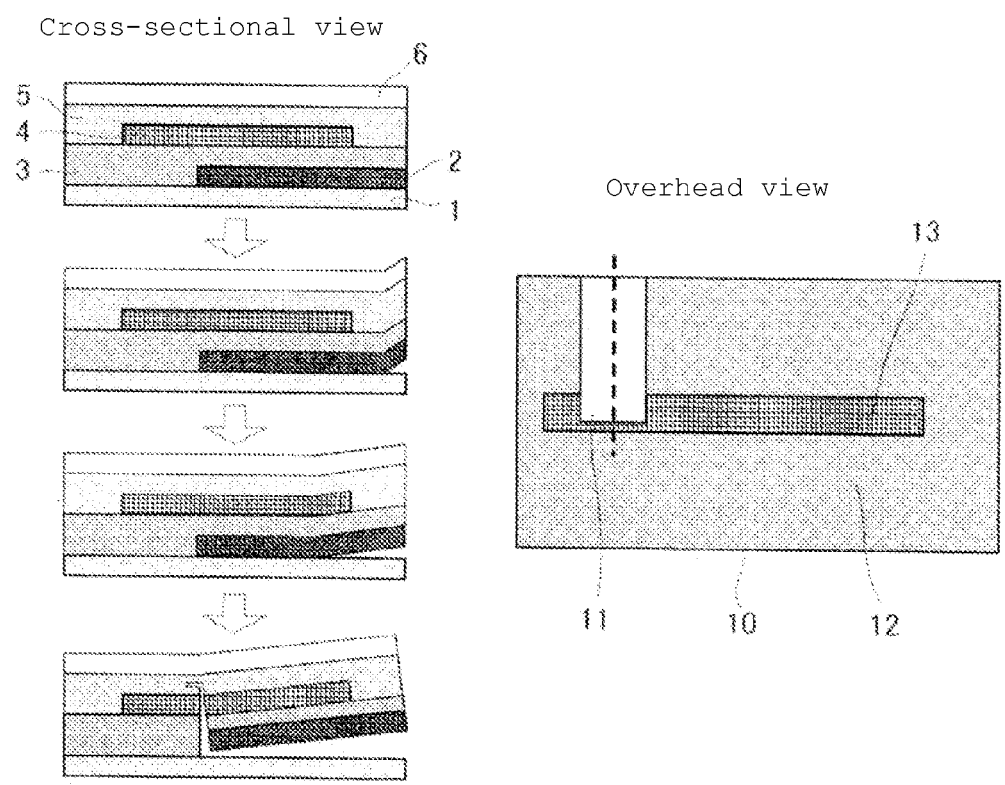
FIG. 2 shows a cross-sectional view and an overhead view of the RFID inlet antenna of the present invention, and a schematic diagram showing how the detachment proceeds upon unauthorized detachment.

A polyethylene terephthalate film with a thickness of 38 µm was prepared as a resin base film. Subsequently, a release coating liquid was prepared by mixing polyethylene terephthalate in an amount of 1 part by weight per 100 parts by weight of an acrylic resin and diluting the mixture with an appropriate amount of an organic solvent. The release coating liquid was applied to one side of the resin base film by gravure printing and the organic solvent was evaporated by drying using warm air at 60° C., thus forming a release coating layer with a thickness of 1 µm. The release coating layer was formed in such a manner as to overlap an end portion of the resin base film and a portion of the posterior metallic circuit in an overhead view of the RFID inlet antenna (see FIG. 2).

A metallic circuit was formed in the following manner. First, JIS 8079 aluminum foil with a thickness of 20 µm (produced by Toyo Aluminium K.K.) was prepared. Secondly, an adhesive prepared by mixing 10 parts by weight of LX-500 (an adhesive) and 1 part by weight of KW75 (an adhesive) (both produced by DIC Corporation) by a disper and diluting the mixture with an appropriate amount of an organic solvent was applied to the surface of the aluminum foil. The organic solvent was evaporated by drying using warm air at 60° C., thus forming an adhesive layer with a thickness of 3 µm. Subsequently, the release coating layer-formed side of the resin base film and the adhesive layer were bonded together, and then aging was performed at 40° C. for 3 days to cure the adhesive. After the adhesive was cured, the aluminum foil was processed by an exposure/development system to form a metallic circuit (line width: 0.3 mm). An RFID inlet antenna was thereby produced.

Example 2

An RFID inlet antenna was produced in the same manner as in Example 1, except that the metallic circuit was formed by using a JIS 8079 aluminum foil with a thickness of 30 µm (produced by Toyo Aluminium K.K.).

Example 3

An RFID inlet antenna was produced in the same manner as in Example 1, except that the line width of the metallic circuit was 0.9 mm.

Example 4

An RFID inlet antenna was produced in the same manner as in Example 1, except that the line width of the metallic circuit was 1.2 mm.

Comparative Example 1

Figure 1:
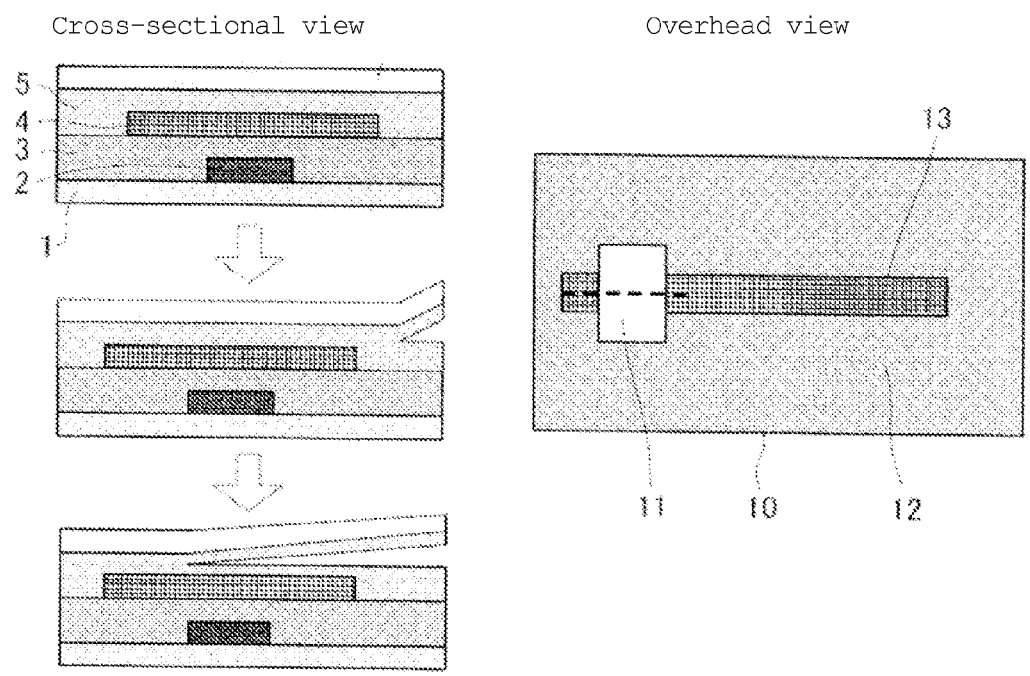
FIG. 1 shows a cross-sectional view and an overhead view of a conventional RFID inlet antenna, and a schematic diagram showing how the detachment proceeds upon unauthorized detachment.

An RFID inlet antenna was produced in the same manner as in Example 1, except that the release coating layer was formed in such a manner as to overlap a portion of the metallic circuit in the RFID inlet antenna, but not to extend to a portion of the outer periphery of the resin base film in an overhead view of the RFID inlet antenna. That is, the release coating layer was embedded in the adhesive layer (see FIG. 1).

Test Example 1 (Peeling Test)

A cover member (wood-free paper: 64 g/m) was laminated via a bonding material on the metallic circuit-formed side of each of the RFID inlet antennas prepared in Examples 1 to 4 and Comparative Example 1. The bonding material was prepared by mixing 100 parts by weight of Binsol R-8510N (a bonding agent) and 1.7 parts by weight of Binsol B-45 (a bonding agent) (both produced by Ipposha Oil Industries Co., Ltd.) by a disper and diluting the mixture with an appropriate amount of an organic solvent. The bonding material was applied to the surface of the cover member and the organic solvent was evaporated using warm air at 60° C., thus forming a bonding material layer with a thickness of 30 µm. The bonding material layer and the metal circuit side of each of the RFID inlet antennas prepared in Examples 1 to 4 and Comparative Example 1 were bonded together, and aging was performed at 40° C. for 2 days.

A peeling test was performed by pulling the resin base film and the cover member in the opposite directions at a rate of 50 mm/min. When the metallic circuit was destroyed and separated into the resin base film side and the cover member side, the RFID inlet antenna was evaluated as A. When the metallic circuit was not destroyed and remained on the resin base film side, the RFID inlet antenna was evaluated as B. Table 1 shows the evaluation results.

TABLE 1

| | Example 1 | Example 2 | Example 3 | Example 4 | Comparative Example 1 |
|---|---|---|---|---|---|
| Evaluation results | A | A | A | A | B |

The results of Table 1 clearly show that the RFID inlet antennas of Examples 1 to 4 comprising a release coating layer formed in such a manner as to overlap at least a portion of the outer periphery of the RFID inlet antenna and a portion of the metallic circuit in an overhead view of the RFID inlet antennas were subjected to the peeling test, the metallic circuit was destroyed and separated into the resin base film side and the cover member side, thus preventing unauthorized detachment and unauthorized use. In contrast, when the RFID inlet antenna of Comparative Example 1 was subjected to the peeling test, the metallic circuit was not destroyed and remained on the resin base side, thus failing to prevent unauthorized detachment and unauthorized use.

DESCRIPTION OF THE REFERENCE SYMBOLS

1. Resin base film
2. Release coating layer
3. Adhesive layer
4. Metallic circuit
5. Bonding material
6. Cover member
10. Outer periphery of the RFID inlet antenna
11. Releasable portion (release coating layer)
12. Non-releasable portion
13. Metallic circuit

The invention claimed is:
1. An RFID inlet antenna comprising:
   a resin base film;
   a metallic circuit formed via an adhesive layer on the surface of the resin base film;
   a release coating layer provided on a portion of the interface between the resin base film and the adhesive layer; and
   a bonding material disposed in such a manner as to cover the metallic circuit; and the antenna being bonded to an item by the bonding material,
   (1) wherein the bonding strength between the release coating layer and the resin base film is weaker than the bonding strength between the adhesive layer and the resin base film,
   (2) the release coating layer is formed in such a manner as to overlap at least a portion of the end portion of the resin base film and a portion of the metallic circuit in an overhead view of the RFID inlet antenna, and
   wherein upon unauthorized detachment of the metallic circuit, the release coating layer is detached from the resin base film before cohesion of the adhesive layer is destroyed, and after complete detachment of the release coating layer, detachment proceeds in such a manner that the metallic circuit is cut or destroyed.
2. The RFID inlet antenna according to claim 1, wherein the metallic circuit is made of aluminum or copper.
3. The RFID inlet antenna according to claim 1, wherein the bonding strength between the release coating layer and the resin base film is 1 N/15 mm or less.

4. The RFID inlet antenna according to claim 1, wherein the bonding strength between the adhesive layer and the resin base film is 3 N/15 mm or more.

5. The RFID inlet antenna according to claim 1, wherein the metallic circuit portion that overlaps an end portion of the release coating layer in the overhead view of the RFID inlet antenna has a line width of 1.2 mm or less and a thickness of 30 μm or less.

6. An RFID using the RFID inlet antenna according to claim 1.

7. The RFID inlet antenna according to claim 2, wherein the bonding strength between the release coating layer and the resin base film is 1 N/15 mm or less.

8. The RFID inlet antenna according to claim 2, wherein the bonding strength between the adhesive layer and the resin base film is 3 N/15 mm or more.

9. The RFID inlet antenna according to claim 3, wherein the bonding strength between the adhesive layer and the resin base film is 3 N/15 mm or more.

10. The RFID inlet antenna according to claim 2, wherein the metallic circuit portion that overlaps an end portion of the release coating layer in the overhead view of the RFID inlet antenna has a line width of 1.2 mm or less and a thickness of 30 μm or less.

11. The RFID inlet antenna according to claim 3, wherein the metallic circuit portion that overlaps an end portion of the release coating layer in the overhead view of the RFID inlet antenna has a line width of 1.2 mm or less and a thickness of 30 μm or less.

12. The RFID inlet antenna according to claim 4, wherein the metallic circuit portion that overlaps an end portion of the release coating layer in the overhead view of the RFID inlet antenna has a line width of 1.2 mm or less and a thickness of 30 μm or less.

13. An RFID using the RFID inlet antenna according to claim 2.

14. An RFID using the RFID inlet antenna according to claim 3.

15. An RFID using the RFID inlet antenna according to claim 4.

16. An RFID using the RFID inlet antenna according to claim 5.

* * * * *